UNITED STATES PATENT OFFICE.

JOHN C. SHERMAN, OF BROOKLINE, MASSACHUSETTS.

TOILET COMPOSITION.

933,395.  Specification of Letters Patent.  Patented Sept. 7, 1909.

No Drawing.  Application filed August 3, 1908. Serial No. 446,539.

*To all whom it may concern:*

Be it known that I, JOHN C. SHERMAN, of Brookline, in the county of Norfolk and State of Massachusetts, have invented certain new and useful Improvements in Toilet Compositions, of which the following is a specification.

As a new toilet preparation, I have invented a composition based on powdered milk with admixture of suitable materials of cleansing, preservative, and saponaceous nature, the composition being termed by me " saponified milk."

The use of fluid milk as a wash for delicate skin, notably for softening the skin and beautifying the complexion, has long been known. I find that ordinary milk or skimmed milk may be reduced to a fine, substantially white powder, and used in this form in conjunction with water, as a cosmetic to be rubbed on the wetted skin or dissolved in water, and the solution used as a bath, the effect being to beautify and soften the skin. To render this powdered milk acceptable and marketable in a cleansing composition, I preferably mix it with a small percentage of a preservative medium, such as powdered borax or boracic acid crystals, and a suitable percentage by weight of powdered soap, the whole constituting a saponified milk composition, to which may be added a small percentage of suitable aromatic or perfuming powder, such as orris root or heliotrope. To said composition may be also added any suitable abrasive material, such as corn meal, or corn meal and lime, or lime alone in powdered or granular form, the composition thus formed constituting an embodiment of the invention.

The admixture with the powdered milk, of suitable odorous or aromatic, and preservative or antiseptic, and detergent substances, adds greatly to the usefulness and value of the powdered milk, by adapting it commercially for toilet and cleansing purposes.

The following proportions may be employed in producing compositions embodying my invention: powdered milk, eighty per cent. by weight, boric acid, five per cent. by weight, soap powder, five per cent. by weight, corn meal, ten per cent. by weight.

The perfume employed is so slight in quantity that it does not add appreciably to the weight of the composition.

The described mixture may be subjected in suitable molds to heavy pressure and thus converted into solid cakes adapted to be used as toilet soap.

My improved composition is characterized, first, by the fact that it is desiccated, and secondly, that the mixture of the powdered milk with the comminuted soap is purely mechanical, the soap having been previously saponified and comminuted. The powdered milk is therefore merely assembled mechanically with the comminuted soap without chemical alteration of the milk powder by the soap, so that the milk powder is ready to dissolve upon the skin when used in the bath, and there exert its well known whitening effect far more markedly than would be the case if the milk powder had been permitted to undergo saponification in process of admixture with the soap.

I am aware that it has been heretofore proposed to make soap by adding concentrated milk to a soap mass containing an excess of alkali to secure the saponification of the fatty element of the milk, the result being a solidified or homogeneous soap product in which the concentrated milk and the soap are chemically combined, the milk being chemically changed by the saponification of its fatty element. My composition, on the other hand, besides being a dry or desiccated powder, is composed in part of milk powder which has not undergone a chemical change and possesses the full value of the milk as a means of improving and whitening the skin.

I claim:

1. A desiccated toilet preparation comprising a mechanical mixture of milk powder and comminuted soap, the soap being saponified previously to its mixture with the milk powder.

2. A toilet preparation comprising milk powder, a preservative medium of the character described, and comminuted soap.

3. A toilet preparation, comprising milk powder, comminuted soap, and a preservative medium, and an abrasive medium, each of the character described.

4. A toilet preparation, comprising milk powder, borax, and comminuted soap.

5. A toilet preparation, comprising milk powder, borax, comminuted soap, and an abrasive medium of the character described.

6. A toilet preparation, comprising milk powder, borax, comminuted soap, and corn meal.

In testimony whereof I have affixed my signature, in presence of two witnesses.

JOHN C. SHERMAN.

Witnesses:
F. R. ROULSTONE,
P. W. PEZZETTI.